United States Patent [19]
Daly et al.

[11] Patent Number: 6,120,688
[45] Date of Patent: Sep. 19, 2000

[54] PORTABLE REVERSE OSMOSIS UNIT FOR PRODUCING DRINKING WATER

[75] Inventors: Frederick J. Daly; Ake Deutschmann, both of Burlington; Henry Behmann, Puslinch; Martin J. Hauschild, Burlington, all of Canada

[73] Assignee: Zenon Environmental, Inc., Burlington, Canada

[21] Appl. No.: 09/020,726

[22] Filed: Feb. 9, 1998

Related U.S. Application Data

[60] Provisional application No. 60/038,512, Feb. 25, 1997.

[51] Int. Cl.[7] .......................... B01D 61/00; B01D 63/00
[52] U.S. Cl. .................. 210/650; 210/636; 210/195.2; 210/257.2; 210/333.01; 210/333.1; 210/85; 210/89; 210/100; 210/108
[58] Field of Search .................. 210/636, 650, 210/195.2, 257.2, 333.1, 333.01, 805, 85, 89, 106, 100, 108, 321.69

[56] References Cited

U.S. PATENT DOCUMENTS

| | | | |
|---|---|---|---|
| 3,992,301 | 11/1976 | Shippey et al. | 210/23 |
| 4,574,049 | 3/1986 | Pittner | 210/639 |
| 4,670,144 | 6/1987 | McCausland et al. | 210/244 |
| 4,842,724 | 6/1989 | Bray et al. | 210/104 |
| 4,921,610 | 5/1990 | Ford et al. | 210/636 |
| 5,004,535 | 4/1991 | Bosko et al. | 210/90 |
| 5,059,317 | 10/1991 | Marius et al. | 210/202 |
| 5,223,132 | 6/1993 | Yoon | 210/232 |
| 5,244,579 | 9/1993 | Horner et al. | 210/652 |
| 5,248,424 | 9/1993 | Cote et al. | 210/636 |
| 5,282,972 | 2/1994 | Hanna et al. | 210/652 |
| 5,403,479 | 4/1995 | Smith et al. | 210/321.69 |
| 5,501,798 | 3/1996 | Al-Samadi et al. | 210/652 |
| 5,520,816 | 5/1996 | Kuepper | 210/649 |
| 5,560,393 | 10/1996 | Clack | 137/562 |
| 5,585,531 | 12/1996 | Barker et al. | 588/20 |
| 5,589,066 | 12/1996 | Gray | 210/258 |
| 5,632,892 | 5/1997 | Klein | 210/257.2 |
| 5,639,373 | 6/1997 | Mahendrane et al. | 210/636 |
| 5,643,455 | 7/1997 | Kopp et al. | 210/636 |
| 5,647,973 | 7/1997 | Desaulniers | 210/96.2 |
| 5,647,988 | 7/1997 | Kawanishi et al. | 210/636 |
| 5,676,824 | 10/1997 | Jeon et al. | 210/85 |
| 5,685,980 | 11/1997 | Patapoff et al. | 210/244 |

*Primary Examiner*—Ana Fortuna
*Attorney, Agent, or Firm*—Andrew Alexander

[57] ABSTRACT

A method of purifying impure water to provide drinking water using an apparatus, the method comprising the steps of providing a microfiltration unit, a reverse osmosis unit and a CIP (clean-in-place) tank containing retentate interconnected to permit backflushing the microfiltration filter with retentate and continued or uninterrupted operation of the reverse osmosis unit by directing retentate thereto.

17 Claims, 1 Drawing Sheet

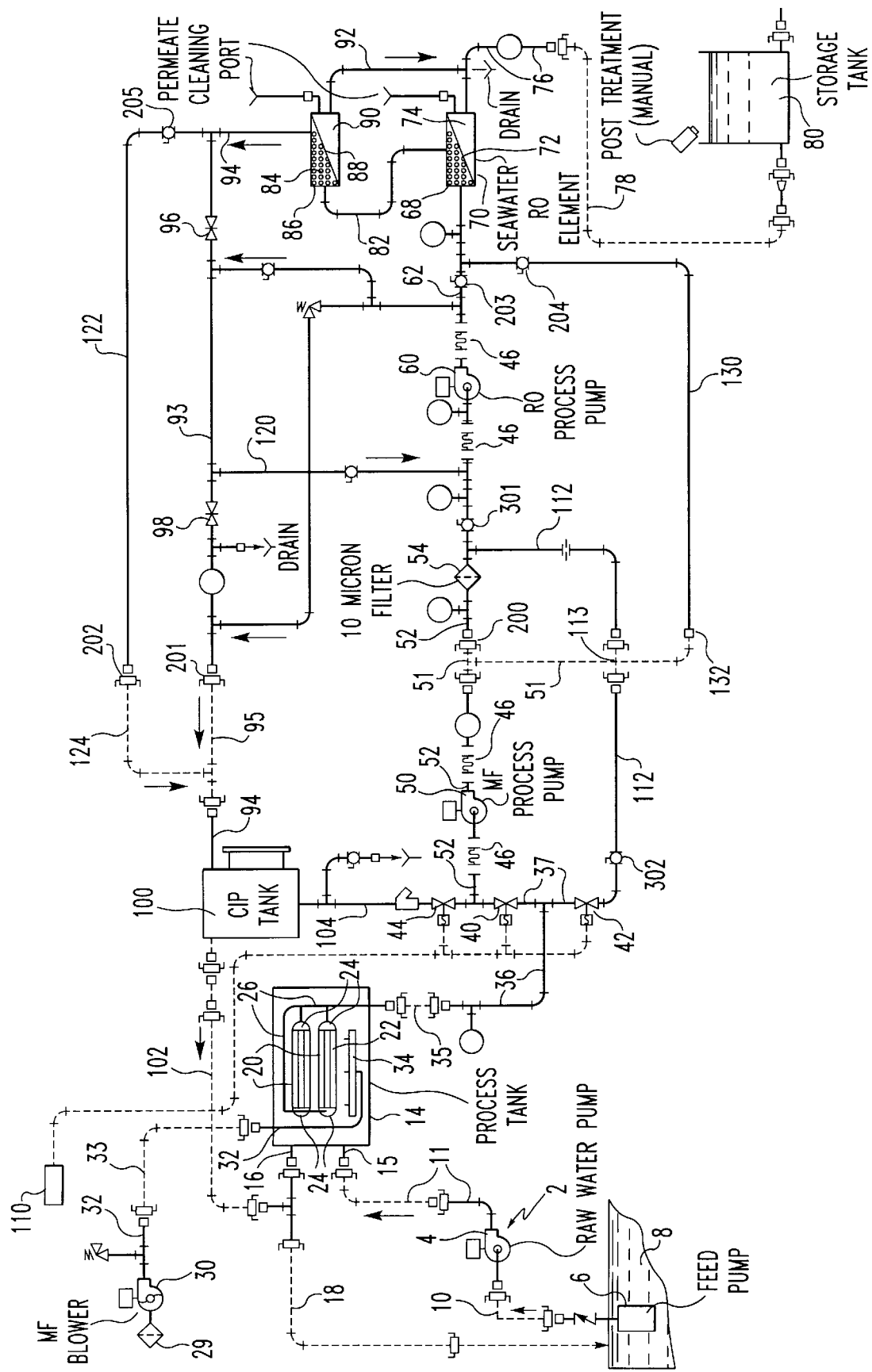

PORTABLE REVERSE OSMOSIS UNIT FOR PRODUCING DRINKING WATER

CROSS REFERENCE TO RELATED APPLICATION

This application claims the benefit of U.S. Provisional Application No. 60/038,512, filed Feb. 25, 1997, incorporated herein by reference.

BACKGROUND OF THE INVENTION

This invention relates to a method and apparatus for producing drinking water from impure water and more particularly, it relates to a portable apparatus and method for producing drinking water from impure water using microfiltration and reverse osmosis.

In the past, many devices have been proposed for producing drinking water from contaminated water. For example, U.S. Pat. No. 5,059,317 discloses an installation for filtering drinking water out of contaminated water, which can be used in many different situations. It consists of a hydrocyclone, a micro filter unit, a unit for reverse osmosis, a mixed bed ion exchange, a re-salting unit, a unit for oxonization, an activated carbon filter and a unit for chlorinization.

Also, U.S. Pat. No. 5,244,579 discloses a self-contained, transportable reverse osmosis water purification unit which has a limited throughput of no more than about 20 gpm of permeate in a single pass operation with reverse osmosis ("RO") modules which can be cleaned in place. When raw water is particularly fouled, the unit is operated in a double pass operation in which the permeate from the first pass is used as feed for a second RO module. A high pressure pump is required to feed water freed from suspended solids to the RO modules. The pump also delivers concentrate to a bladder tank where the concentrate is stored under pressure (about 100 psig) to flush a coarse filter automatically when it is plugged. Fine filters for solids removal can be replaced when the unit is not producing permeate.

U.S. Pat. No. 3,992,301 discloses an automatic flushing and cleaning system for membrane separation machines such as reverse osmosis machines having plural modules or membranes. Cleaning may be by way of reducing the pressure to allow the membrane to relax, by the injection of air or inert gas to provide turbulence, and/or by injection of flushing liquid which may include chemical cleaning additives. Pumps, automatic valving, and pressure controls are provided, along with a complete timer operated electrical sequencing system whereby desired purging, flushing and cleaning cycles are automatically undertaken at periodic intervals or in response to one or more preferred conditions.

U.S. Pat. No. 4,842,724 discloses self-standing apparatus for filtering supply water to provide purified water which includes a base subassembly and two container subassemblies. One container subassembly provides supply water to filtering apparatus located in the base subassembly. The second container holds purified water which passes through a semipermeable membrane filter in the base subassembly. Concentrate from the membrane filter flows back to the supply water container for ultimate recirculation. The base subassembly and the container subassemblies have automatically closing valves which render each container watertight when separated from the base subassembly, and which open to provide communication between the containers and filtering apparatus within the base subassembly.

U.S. Pat. No. 4,670,144 discloses a portable water purification system including a generally rectangular boxlike chest containing a particulate matter prefilter, a reverse osmosis filter and an activated carbon postfilter unit disposed in a lower base part of the chest. The prefilter, reverse osmosis filter and post-filter units are connected in series by flexible conduits.

U.S. Pat. No. 5,004,535 discloses a reverse osmosis water purification system including a support structure dimensioned and arranged to facilitate manual transportation, purification components mounted on the support structure for producing product water and waste water from feedwater by reverse osmosis, the pump components mounted on the support structure for pumping feedwater from a separate source to the purification means.

U.S. Pat. No. 5,589,066 discloses a portable water purification system which has a prefilter, a pumping unit, a reverse osmosis unit, a microbial control unit and a post filter for removing nuclear, biological, chemical and other contaminants from a water source. The hand operated pumping unit has a feed water cylinder and a concentrate cylinder to control ratios between intake and concentrate volumes. The system further prolongs the life of components by reducing the level of contaminants in contact with parts of the system.

Other patents disclosing water purification systems include U.S. Pat. Nos. 5,223,132; 5,282,972; 5,403,479; 5,501,798; 5,520,816; 5,560,393; 5,585,531; 5,632,892; 5,647,973; 5,676,824; and 5,685,980.

In spite of these disclosures, there is still a great need for a portable water purification unit which can economically and efficiently produce potable water from impure or contaminated water.

SUMMARY OF THE INVENTION

It is an object of this invention to provide an apparatus for efficiently producing drinking water from impure or contaminated water.

It is another object of this invention to provide a portable apparatus utilizing a microfiltration unit and a reverse osmosis unit to efficiently produce potable water from impure water.

It is still another object of this invention to provide a method for producing potable water from contaminated water using a portable apparatus employing a microfiltration unit and a reverse osmosis unit.

And still, it is another object of this invention to provide a method for producing potable water using a portable apparatus employing a microfiltration unit and a reverse osmosis unit which permits continued operation of the reverse osmosis unit during cleaning or backflushing the microfiltration unit to efficiently produce potable water.

These and other objects will become apparent from a reading of the specification and claims appended hereto.

In accordance with these objects, there is provided a method of purifying impure water to provide drinking water using a portable apparatus, the method comprising the steps of providing a microfiltration unit for connecting to an impure water source and to an air source, the microfiltration unit comprised of: (i) a tank for containing impure water; (ii) a microfiltration module positioned in the tank to filter the impure water to provide a concentrate, the microfiltration module comprised of an array of hydrophilic hollow tubular membranes having an inside surface and an outside surface, the membranes having a pore size in the range of about 0.05 to 1.2 $\mu$m; and (iii) an air diffuser located in the tank for diffusing air past the tubular membranes for inducing water movement around the tubular membranes. Water is pumped from the impure water source into the tank and water is drawn through the tubular membranes to provide purified water and simultaneously therewith impurities are rejected to provide concentrate. Excess concentrate is permitted to overflow from the tank back to the impure water source. Purified water from the microfiltration unit is directed to a high pressure side of a reverse osmosis module wherein water permeate is passed through a membrane to a low pressure side of the reverse osmosis module to provide drinking water and impurities are concentrated in the high pressure side to provide a retentate. Retentate is recirculated to a CIP (clean-in-place) container. Periodically, the hollow tubular membranes are backflushed with the retentate from the CIP container by directing the retentate to the inside surfaces of the membranes and by passing the retentate through the membranes thereby dislodging particles from the outside surfaces. During backflushing, retentate from the CIP container is directed to the high pressure side of the reverse osmosis module thereby continuing production of drinking water during the backflushing.

BRIEF DESCRIPTION OF THE DRAWING

The sole FIGURE is a schematic representation showing the flow of water through the apparatus in accordance with the invention.

DETAILED DESCRIPTION OF THE PREFERRED EMBODIMENTS

Referring to the FIGURE, there are shown steps for purifying impure water or contaminated water to produce drinking water using a portable unit or apparatus in accordance with the invention. The impure water source can include diverse water sources, including sea water, surface water and brackish water or other sources of water, and the apparatus can be used during nuclear, chemical and biological warfare. The apparatus is designed for removing contaminants including bacteria, suspended and dissolved solids, viruses, parasites and nuclear, chemical and biological warfare contaminants. The portable apparatus permits improved productivity of drinking water and minimum use of chemicals for cleaning.

The main steps of the system or process include pumping of impure or raw water, microfiltration, booster pumping, reverse osmosis and disinfecting the product or drinking water. If necessary, the apparatus can be disassembled into five units and can be operated with a portable power unit.

In the FIGURE, the raw or impure water pumping system is referred to generally as 2. Thus, there is provided a pump 4 connected to a filter 6 located in water 8 for purposes of illustration. Pump 4 is connected to filter 6 by means of a hose 10 using quick disconnect members. Filter or strainer 6 is used to filter out larger debris including stones, leaves and moss and has about a 500 micron size inlet openings. Pump 4 directs strained water through pipe or hose 11 to tank 14. Pipe 11 can be a flexible hose using quick disconnect features.

Microfiltration unit comprises a tank 14 having an inlet 15 for receiving the impure water from pump 4. In operation, tank 14 is filled with water and excess water is removed or discharged therefrom using exit 16 which discharges water along line 18 typically back into the source of impure or contaminated water. Line 18 may be a flexible hose which is easily connected or disconnected to tank 14.

Tank 14 contains a microfilter 20. Preferably, microfilter 20 is comprised of two modules or arrays of hydrophilic hollow tubular membranes illustrated by lines 22 which are potted in or are connected to headers 24. Thus, in operation, water subjected to microfiltration permeates the walls of hollow tubular membranes 22 and is collected in headers 24 and removed along lines 26. Typically, the tubular hollow membranes 22 have a nominal pore size of 0.2 $\mu$m and are available from Zenon Environmental, Inc. under the trademark ZeeWeed. The tubular hollow membrane is operated to remove suspended solids, microorganisms and algae to provide purified water and a concentrate which is flushed out of tank 14 along line 18 and discharged. It will be appreciated that during operation, water is introduced to tank 14 along lines 11 and discharged along line 18 on a continuous basis thereby discharging concentrate. In normal operation, 20 to 80% of the water introduced to tank 11 is recovered as filtered or purified water, the balance is discharged to remove concentrate.

During operation of microfiltration unit, air is pumped into tank 14 from pump 30 along line 32 to distributor or diffuser 34. The air may be filtered at 29 prior to entering blower 30. Air from diffuser 34 operates to induce movement to water contacting or surrounding the outside of tubular membranes 22 to effect cleaning of the membranes. Depending on the tubular membranes used, movement may be induced to the membrane. That is, percolation of the air can cause the tubular membrane to sway or move in the water, thereby effectively cleaning the membrane.

While an air diffuser is described, any type of diffuser may be utilized to provide movement of water in tank 14 such as an impeller, for example.

A preferred module employing hollow fiber membranes suitable for use in the present invention is disclosed in U.S. Pat. No. 5,639,373, incorporated herein by reference as if specifically set forth. Exemplary of a substantially vertical membrane is shown in FIG. 3 of U.S. Pat. No. 5,639,373. However, the membrane of FIG. 3 may be deployed in a horizontal plane for convenience.

The vertical or horizontal skein is located in the water to present a generally vertical or horizontal profile, but has no structural shape. Such shape changes continuously, the degree of change depending upon the flexibility of the fibers, their lengths, the overall dimensions of the skein, and the degree of movement imparted to the fibers by the water and also by the air from the gas-distribution means.

Other membrane modules may also be used in accordance with the invention.

It will be appreciated that U.S. Pat. Nos. 5,248,424 and 5,639,373 depict configurations of membranes which can be used, and other configurations are contemplated within the purview of the invention. For example, while the skeins of fibers are shown vertical as noted, it will be appreciated that the skeins may be disposed at any angle between horizontal and vertical, as desired.

While any microfiltration membrane or module may be used, another suitable membrane is disclosed in U.S. Pat. No. 5,248,424. The membrane in U.S. Pat. No. 5,248,424 is comprised of an array of hollow fibers. That is, the membrane is comprised of a frameless array of unconfined hollow fibers which provide an effective membrane device for withdrawing permeate from raw water, the flux through the membranes reaching an essentially constant relatively high value because of the deployment of fibers of the array as a skein, arching in a buoyantly swayable generally parabolic configuration. The array extends above at least one of the array's headers in which the terminal end portions of the fibers are potted. The length of each hollow fiber is normally greater than the direct center-to-center distance between the array's pair of headers. For use in a tank 14, an assembly of the array and a gas distributor means has fibers preferable >0.5 meter long, which together provide a surface area >10 m². The terminal end portions of fibers in each header are substantially free from fiber-to-fiber contact. When used in a tank from which the permeate is withdrawn at a location low enough to overcome the transmembrane pressure differential of the fibers, the permeate may be withdrawn under a vacuum induced by gravity. To increase flux, a pump is used which provides a suction less than 75 cm of Hg. When used in combination with a gas-distribution manifold disposed beneath the skein so as to flow bubbles through or between the hollow fibers, the surfaces of the fibers are surprisingly resistant to being fouled by build-up of deposits of contaminants. Membranes with high transmembrane pressure differential are best suited to permeate being removed with a vacuum pump.

As disclosed in U.S. Pat. No. 5,248,424, the hollow fibers used to form the skein of an array may be formed of any membrane material provided the fibers are flexible. Preferred fibers operate with a transmembrane pressure differential in the range from about 3.5 kPa (0.5 psi) to about 175 kPa (25 psi). Most preferred are hollow fibers which provide a transmembrane pressure differential in the range from 7 kPa (1 psi) to 69 kPa (10 psi).

Preferred hollow fibers are made of organic polymers and ceramics, whether isotropic, or anisotropic, with a thin layer or skin on the outside surface of the fibers. Some fibers may be made from braided cotton covered with a porous natural rubber latex or a water-insoluble cellulosic polymeric material. Preferred organic polymers for fibers are polysulfones, poly(styrenes), including styrene-containing copolymers such as acrylonitrile-styrene, butadiene-styrene and styrene-vinylbenzylhalide copolymers, polycarbonates, cellulosic polymers, polypropylene, poly(vinyl chloride), poly (ethylene terephthalate), and the like disclosed in U.S. Pat. No. 4,230,463 the disclosure of which is incorporated by reference thereto as if fully set forth herein. Preferred ceramic fibers are made from alumina by E. I. duPont deNemours Co. and disclosed in U.S. Pat. No. 4,069,157, incorporated herein by reference as if set forth.

In the array, the fibers may be deployed in the substrate to form an unsupported arch or loop, the dimensions of the arch or loop being determined by the length of the skein and the spacing of the headers or the fibers may be just slightly longer than the distance between the headers. Though, the generally parabolic arch formed is usually symmetrical because the headers are coplanarly disposed within the substrate, the shape of the arch may also be asymmetrical. The arch is asymmetrical when one header is disposed at a lower level, transversely spaced-apart from the other.

For hollow fiber membranes, the outside diameter of a fiber is at least 20 µm and may be as large as about 3 mm, typically being in the range from about 0.1 mm to 2 mm. The larger the outside diameter the less desirable the ratio of surface area per unit volume of fiber. The wall thickness of a fiber is at least 5 µm and may be as much as 1.2 mm, typically being in the range from about 15% to about 60% of the outside diameter of the fiber, most preferably from 0.5 mm to 1.2 mm.

The average pore cross-sectional diameter in a fiber may vary widely, being in the range from about 5 to 10,000 Å. The preferred pore diameter for ultrafiltration of components is a substrate feedstream being in the range from about 5 to 1,000 Å; and for microfiltration, in the range from 1,000 to 10,000 Å, for example.

The length of a fiber in a skein is essentially independent of the strength of the fiber, or its diameter, because the skein is buoyed, both by bubbles and the substrate in which it is deployed. The length of each fiber in the skein is preferably determined by the conditions under which the array is to operate. Typically, fibers range from 1 m to about 5 m long, depending upon the dimensions of the body of substrate (depth and width) in which the array is deployed.

The number of fibers in an array is arbitrary, typically being in the range from about 1,000 to about 10,000, and the preferred surface area for a skein is in the range from 10 m² to 100 m².

Air may be provided continuously or intermittently, better results generally being obtained with continuous air flow. The amount of air provided depends upon the type of substrate and the susceptibility of the surfaces of the fibers to be plugged. Air may be provided to tank 10 continuously and typically added continuously at a rate of 0.005 to 0.5 ft³/min/ft² of membrane surface. If the air is added intermittently, the same rates can apply and the interval may be 1 to 30 minutes.

As noted, purified water is removed from headers 24 along lines 26 and directed along line 36. Part of line 36 can feature a quick disconnect portion 35. Purified water is directed along line 36 to line 37. Under normal operation, purified water is directed through valve 40 which is open. Also, under normal operation, both valves 42 and 44 are closed. Thus, under normal operation microfiltration process pump 50 draws purified water along lines 26, 35, 36 and 37 and directs the purified water along line 51 and 52 through microfilter 54 to reverse osmosis process pump 60. Line 52 may include a hose 51 having quick-disconnect features.

Flexible hoses 46 may be provided on either side of pumps 50 and 60. Between pumps 50 and 60, pressure valves may be provided to ensure the pressure required in line 52.

Pump 60 directs purified water along line 62 to high pressure side 68 of reverse osmosis unit 70. Water permeate is withdrawn through membrane 72 to low pressure side 74 where it is directed along line 76 to a storage tank 80. Line 76 may be provided with a quick disconnect feature 78. Any type of reverse osmosis membrane may be used with a preferred type being spiral wound sea water rejection type membranes.

In the present invention, impurities are concentrated in high pressure side 68 to provide a retentate. The subject invention may be operated with a single reverse osmosis module. However, it is preferred that retentate is directed along 82 to high pressure side 84 of second reverse osmosis unit 86. Reverse osmosis unit 86 is provided with a membrane 88 and low pressure side 90. Water permeate is drawn or forced through membrane 88 to provide potable water which is directed along line 92 to line 76 to storage tank 80.

In the present invention, under normal operations, retentate from reverse osmosis unit 86 is directed along line 94 through valves 96 and 98 to CIP (clean-in-place) tank 100. Line 94 may have a quick-disconnect portion 95. When CIP tank 100 is full, excess retentate is directed along line 102 to line or adapter 16 to line 18 back to the source of water 8.

CIP tank 100 normally contains retentate. Further, CIP tank 100 is connected by lines 104 to lines 37 and 52 through valve 44 which under normal operating conditions is closed as shown in the FIGURE. Further, valve 42 is normally closed.

CIP tank 100 provides a source of water for backflushing tubular membranes 22. That is, it should be understood that microfiltration membranes 22 are flushed with reverse osmosis retentate or concentrate to remove or purge foulants such as solids or particles from the pores or surface. This operation is controlled by a programmable logic controller 110 which is electrically connected to solenoid valve 40 (first valve), 42 (second valve) and 44 (third valve). That is, on backflushing, programmable logic controller 110 opens valves 44 and 42 and closes valve 40. Instead of drawing water from membranes 22, pump 50 draws retentate from CIP tank 100 along line 104 through valve 44 (now open) along line 52 and into line 112, including quick-disconnect hose 113. On backflush, the retentate is directed through valve 42 (now open) through lines 36 and 26. The retentate enters the inside of tubular membrane 22 and dislodges foulants from the membranes. Backflushing may be programmed at any desired interval for any desired period.

Typically, backflushing occurs about every 19 minutes. However, backflushing may be programmed to occur earlier or later at least once every two hours, depending on the supply water, and such times are incorporated herein as if specifically set forth. Further, the period or duration of backflushing typically is about 20 seconds, however, this period can be shorter or longer, e.g., 5 to 50 seconds.

Simultaneously with backflushing, in the preferred operation a portion of the reverse osmosis retentate or concentrate is pumped along lines 52 and 62 to reverse osmosis module in order that operation of the reverse osmosis unit is not interrupted during backflushing. This greatly facilitates the efficiency of the unit. Stopping flow of liquid to reverse osmosis module means turning off pump 60 and then turning it on again after backflushing. This requires time to ramp the flow down and then up again and in addition, it can increase the wear on the reverse osmosis module. Thus, shutting down the reverse osmosis system for short intervals during operation is minimized. Further, during backflushing, preferably blower 30 and water pump 2 continue to operate. In this mode, particles or foulants dislodged from the membrane are efficiently flushed from tank 14. At the end of the backflushing operation, valves 44 and 42 are closed and valve 40 opened and the process is returned to normal operation.

In another aspect of the invention, retentate from reverse osmosis unit 86 can be recycled along line 94 through valve 96 (shown open) into line 93. Valve 98 can be closed or throttled and thus water is directed along line 120 to line 52 where pump 60 recirculates the retentate to high pressure side 68. The recirculation can be increased or decreased as desired. Having a high recirculation rate operates to minimize fouling of the membranes in the reverse osmosis units. Recirculation also assures that the minimum feed flow requirement of pump 60 is achieved and also increases system recovery and productivity. It will be understood that even with valve 98 open retentate can be recirculated by pump 60.

In the present invention, valve 96 is used to regulate the pressure in the reverse osmosis membranes during normal operation. Valve 96 is closed when chemically cleaning the reverse osmosis membranes, redirecting fluid flow through lines 122 and 124. This path is particularly useful when chemical cleaning material is introduced to CIP tank 100 for purposes of cleaning reverse osmosis membranes 72 and 88. This avoids passing cleaning solution through valves 96 and 98 which would cause a high pressure drop. It will be appreciated that chemical cleaning of the reverse osmosis membranes is performed at high flow rates and low pressure.

When chemical cleaning of the reverse osmosis product is performed, hose 51 is disconnected at point 200 and connected at point 132. Hose 95 is disconnected from point 201 and connected to point 202 to provide line 124. Valves 96 and 203 are closed and valves 204 and 205 are opened. CIP tank 100 is filled with cleaning solution. Pump 50 recirculates the cleaning solution through a closed circuit. Filter 54 and pump 60 are by-passed to prevent a drop in pressure and reduced flow velocity. Also, pump 60 is protected from the cleaning solution. Thus, during chemical cleaning, cleaning solution flows from CIP tank 100 through lines 104, 44, 52, 46, 51, 130, 62, reverse osmosis units 94, 122 and 124 back into CIP tank 100.

It should be noted that hoses 10, 11, 18, 33, 35, 51, 78, 95, 113 and 124 provide for disconnect features which permit the reverse osmosis unit to be separated from the microfiltration unit or the storage tank. Separating these parts of the apparatus permits ease of handling or carrying of the individual units by personnel. Further, it should be noted that the microfiltration unit can be operated separate from the reverse osmosis unit or vice versa, depending on the quality of the water.

When chemical cleaning of microfiltration membranes 22 is required, valve 301 is closed, logic controller 110 is set at manual, valves 42 and 44 are opened and valve 40 closed. Tank 14 is drained. Cleaning solution is pumped from CIP tank 100 through pump 50 along lines 112, 37, 36, 35 into membranes 22. Valve 302 is used to regulate pressure to membranes 22.

While the invention has been described in terms of preferred embodiments, the claims appended hereto are intended to encompass other embodiments which fall within the spirit of the invention.

What is claimed is:

1. A method of purifying impure water to provide drinking water, the method comprising the step of:
    (a) providing a microfiltration unit in fluid communication with an impure water source and with an air source, the microfiltration unit comprised of:
        (i) a tank for containing said impure water;
        (ii) a microfiltration membrane positioned in said tank to filter said impure water to provide a concentrate, the microfiltration membrane comprised of an array of hollow tubular membranes having an inside surface and an outside surface;
        (iii) an air diffuser located in said tank for diffusing air past said tubular membranes for inducing water movement around said tubular membranes;
    (b) directing water from said impure water source into said tank;
    (c) drawing filtered water through said tubular membranes to provide purified water and simultaneously therewith rejecting impurities to provide said concentrate;
    (d) permitting excess concentrate to flow from said tank;
    (e) pumping said purified water to a high pressure side of a reverse osmosis module wherein water is permeated through a membrane to a low pressure side of said reverse osmosis module to provide said drinking water and wherein impurities are concentrated in said high pressure side to provide a retentate;
    (f) returning retentate from the high pressure side of said reverse osmosis module to a CIP (clean-in-place) container;
    (g) periodically backflushing said hollow tubular membranes with said retentate from said CIP container, said retentate directed to the inside surfaces of said membranes to dislodge foulants from the outside surfaces of said membranes; and (h) continuing production of drinking water during said backflushing by directing flow of retentate to the high pressure side of said reverse osmosis module and recovering drinking water on said low pressure side.

2. The method in accordance with claim 1 including providing said hollow tubular membrane in a pore size in the range of 0.05 to 1.2 µm.

3. The method in accordance with claim 1 including the step of pumping said impure water into said container.

4. The method in accordance with claim 1 including recovering about 20 to 80% of said impure water as purified water.

5. The method in accordance with claim 1 including the step of backflushing said hollow tubular membranes at least once every two hours.

6. The method in accordance with claim 1 including the step of backflushing said hollow tubular membranes at least once every hour.

7. The method in accordance with claim 1 including the step of backflushing said hollow tubular membranes for a period of about 5 to 60 seconds.

8. The method in accordance with claim 1 including the step of permitting excess retentate to overflow from said CIP container.

9. A method of purifying impure water to provide drinking water, the method comprising the step of:
   (a) providing a microfiltration unit in fluid communication with an impure water source, the microfiltration unit comprised of a microfiltration module positioned in said impure water, the microfiltration membrane comprised of an array of hollow tubular membranes having an inside surface and an outside surface;
   (b) drawing filtered water through said tubular membranes to provide purified water and simultaneously therewith rejecting impurities;
   (c) pumping said purified water to a high pressure side of a reverse osmosis module wherein water permeate is passed through a membrane to a low pressure side of said reverse osmosis module to provide said drinking water and wherein impurities are concentrated in said high pressure side to provide a retentate;
   (d) returning retentate to a CIP (clean-in-place) container;
   (e) backflushing said hollow tubular membranes with said retentate at least once every two hours, said retentate directed to the inside surfaces of said membranes to dislodge particles from pores in said membranes;
   (f) continuing production of drinking water during said backflushing by directing flow of retentate to the high pressure side of said reverse osmosis module and recovering drinking water on said low pressure side.

10. A method of purifying impure water to provide drinking water using a portable apparatus, the method comprising the step of:
    (a) providing a microfiltration unit in fluid communication with an impure water source and with an air source, the microfiltration unit comprised of:
       (i) a tank for containing said impure water;
       (ii) a microfiltration membrane positioned in said tank to filter said impure water to provide a concentrate, the microfiltration membrane comprised of an array of hydrophilic hollow thydrophilic hollow tubular membranes having an inside surface and an outside surface;
       (iii) a diffuser located in said tank for inducing water movement around said tubular membranes;
    (b) pumping water from said impure water source into said tank;
    (c) drawing filtered water through said tubular membranes to provide purified water and simultaneously therewith reject impurities to provide said concentrate to recover about 20 to 80% of said impure water introduced to said tank;
    (d) permitting excess concentrate to overflow from said tank;
    (e) directing said purified water to a high pressure side of a reverse osmosis module wherein water permeates through a membrane to a low pressure side of said reverse osmosis module to provide said drinking water and wherein impurities are concentrated in said high pressure side to provide a retentate;
    (f) returning said retentate to a CIP (clean-in-place) container;
    (g) backflushing said hollow tubular membranes with said retentate from said CIP container at least once every two hours, said backflushing being for a period of 5 to 60 seconds, said retentate directed to the inside surfaces of said membranes to dislodge particles from the surfaces of said membranes;
    (h) continuing production of drinking water during said backflushing by directing flow of retentate to the high pressure side of said reverse osmosis module and recovering drinking water on said low pressure side.

11. A system for purifying impure water to provide drinking water, the system comprised of:
    (a) a microfiltration unit for fluid communication with an impure water source, the microfiltration unit comprised of:
       (i) a tank for containing said impure water;
       (ii) a microfiltration membrane positioned in said tank to filter said impure water to provide a concentrate, the microfiltration membrane comprised of an array of hollow tubular membranes having an inside surface and an outside surface;
       (iii) an air diffuser located in said tank for diffusing air past said tubular membranes for inducing water movement around said tubular membranes;
    (b) an air pump in fluid communication with said diffuser for pumping air thereto;
    (c) a first pump for pumping said impure water into said tank;
    (d) a second pump for drawing filtered water through said tubular membranes to provide purified water and simultaneously therewith reject impurities to provide said concentrate;
    (e) an overflow in said tank for permitting excess concentrate to overflow from said tank;
    (f) a reverse osmosis module having a high pressure side and a low pressure side separated by a membrane;
    (g) a third pump in fluid communication with said second pump for receiving purified water therefrom and for directing said purified water to said high pressure side of said reverse osmosis module to permeate water therethrough to said low pressure side to provide said drinking water and to concentrate impurities in said high pressure side to provide a retentate; and
    (h) a CIP (clean-in-place) container in fluid communication with said high pressure side of said reverse osmosis module for receiving retentate therefrom, said CIP container
       (i) in fluid communication with said microfiltration membranes for periodically backflushing said hollow tubular membranes with said retentate directed to the inside surfaces of said membranes to dislodge particles from the outside surfaces of said membranes; and (ii) in fluid communication with said high pressure side of said reverse osmosis membrane for directing flow of said retentate to the high pressure side of said reverse osmosis module to continue production of drinking water from said retentate during said backflushing.

12. The system in accordance with claim 11 in combination therewith a programmable logic controller for opening second and third solenoid valves and closing a first solenoid valve for directing retentate from said CIP tank to both said reverse osmosis module for continued production of drinking water and to said inside surfaces of said tubular membranes for backflushing and dislodging foulants therefrom.

13. The system in accordance with claim 12 wherein said programmable logic controlled is adapted for closing said second and third solenoid valves and opening said first valve to direct purified water from said microfiltration membrane to said high pressure side of said reverse osmosis module.

14. A system for purifying impure water to provide drinking water, the system comprised of:
(a) a microfiltration unit for fluid communication with an impure water source, the microfiltration unit comprised of:
   (i) a tank for containing said impure water;
   (ii) a microfiltration membrane positioned in said tank to filter said impure water to provide a concentrate, the microfiltration membrane comprised of an array of hollow tubular membranes having an inside surface and an outside surface;
   (iii) an air diffuser located in said tank for diffusing air past said tubular membranes for inducing water movement around said tubular membranes;
(b) an air pump in fluid communication with said diffuser for pumping air thereto;
(c) a first pump for pumping said impure water into said tank;
(d) a second pump for drawing filtered water through said tubular membranes and through a first solenoid valve to provide purified water and simultaneously therewith reject impurities to provide said concentrate;
(e) an overflow in said tank for permitting excess concentrate to overflow from said tank;
(f) a reverse osmosis module having a high pressure side and a low pressure side separated by a membrane;
(g) a third pump in fluid communication with said second pump for receiving purified water therefrom and for directing said purified water to said high pressure side of said reverse osmosis module to permeate water therethrough to said low pressure side to provide said drinking water and to concentrate impurities in said high pressure side to provide a retentate;
(h) a CIP (clean-in-place) container in fluid communication with said high pressure side of said reverse osmosis module for receiving retentate therefrom, said CIP container
   (i) in fluid communication through second and third solenoid valves with said microfiltration membranes for periodically backflushing said hollow tubular membranes with said retentate directed to the inside surfaces of said membranes to dislodge particles from the outside surfaces of said membranes; and
   (ii) in fluid communication through said second solenoid valve with said high pressure side of said reverse osmosis membrane for directing flow of said retentate to the high pressure side of said reverse osmosis module to continue production of drinking water from said retentate during said backflushing; and
(i) a programmable logic controller for opening said second and third solenoid valves and closing said first valve for directing retentate from said CIP tank to both said reverse osmosis module for continued production of drinking water and to said inside surfaces of said tubular membranes for backflushing to dislodge foulants therefrom.

15. A portable apparatus for purifying impure water to provide drinking water, the apparatus comprised of:
(a) an air pump for pumping air to provide an air source;
(b) a filter for filtering impure water to provide filtered impure water;
(c) a microfiltration unit in fluid communication with said filtered impure water and said air source, the microfiltration unit comprised of:
   (i) a tank for containing said filtered impure water;
   (ii) a microfiltration membrane positioned in said tank to filter impure water and reject impurities in said filtered impure water to provide a concentrate, the microfiltration membrane comprised of an array of hydrophilic hollow tubular membranes having an inside surface and an outside surface; and
   (iii) an air diffuser in fluid communication with said air source, said diffuser located in said tank adapted for diffusing air past said tubular membranes for inducing water movement around said tubular membranes;
(d) a process pump in fluid communication with said hollow fiber membranes for inducing a lower pressure on said inside surface than on said outside surface of said hollow fiber membranes to draw water into said hollow fibers to provide purified water and simultaneously therewith reject impurities to provide said concentrate;
(e) a reverse osmosis module having a high pressure side and a low pressure side, the high pressure side being in fluid communication with said process pump to receive purified water therefrom, said process pump capable of maintaining said water pressure in said high pressure side to produce water permeate on said low pressure side and water retentate on the high pressure side, said reverse osmosis module adapted to deliver water permeate to a water storage tank; and
(f) a CIP (clean-in-place) tank in fluid communication with said high pressure side of said reverse osmosis module adapted to receive water retentate from said reverse osmosis module; in a backflush mode, said CIP (clean-in-place) tank in fluid communication with said inside surfaces of said hollow tubular membranes to deliver water retentate to said hollow tubular membranes to dislodge particles from outside surfaces thereof; during said backflush mode, said CIP (clean-in-place) tank adapted to supply water retentate to said reverse osmosis module to permit continued operation of said reverse osmosis module during said backflush mode.

16. The portable apparatus in accordance with claim 15 in combination therewith a programmable logic controller for opening second and third solenoid valves and closing a first solenoid valve for directing retentate from said CIP tank to both said reverse osmosis module for continued production of drinking water and to said inside surfaces of said tubular membranes for backflushing and dislodging foulants therefrom.

17. The portable apparatus in accordance with claim 16 wherein said programmable logic controlled is adapted for closing said second and third solenoid valves and opening said first valve to direct purified water from said microfiltration membrane to said high pressure side of said reverse osmosis module.

* * * * *